(12) United States Patent
Gettel

(10) Patent No.: US 10,604,057 B2
(45) Date of Patent: Mar. 31, 2020

(54) RAIL MOUNTING SYSTEM

(71) Applicant: Adrian Steel Company, Adrian, MI (US)

(72) Inventor: Michael D. Gettel, Adrian, MI (US)

(73) Assignee: Adrian Steel Company, Adrian, MI (US)

(*) Notice: Subject to any disclaimer, the term of this patent is extended or adjusted under 35 U.S.C. 154(b) by 121 days.

(21) Appl. No.: 15/832,218

(22) Filed: Dec. 5, 2017

(65) Prior Publication Data

US 2018/0170238 A1    Jun. 21, 2018

Related U.S. Application Data

(60) Provisional application No. 62/436,628, filed on Dec. 20, 2016.

(51) Int. Cl.
*B60P 7/08* (2006.01)
*B60R 7/08* (2006.01)
*B60R 7/02* (2006.01)

(52) U.S. Cl.
CPC .............. *B60P 7/0815* (2013.01); *B60R 7/02* (2013.01); *B60R 7/08* (2013.01)

(58) Field of Classification Search
CPC ..... B60P 7/0815; B60P 7/0807; B60P 7/0823; B60P 7/15; B60P 7/083; B60P 7/0892; B60P 3/073; B60P 3/40
USPC .. 410/102, 106, 101, 110, 98, 90, 81, 80, 7; 248/503, 535, 542, 538, 539, 500; 296/100.07, 30, 36, 63, 40, 41, 204
See application file for complete search history.

(56) References Cited

U.S. PATENT DOCUMENTS

| | | |
|---|---|---|
| 4,248,558 A | 2/1981 | Lechner |
| 4,417,711 A | 11/1983 | Madej |
| 4,575,295 A | 3/1986 | Rebentisch |
| 4,635,992 A | 1/1987 | Hamilton et al. |
| 4,961,553 A | 10/1990 | Todd |
| 5,674,033 A | 10/1997 | Ruegg |
| 6,082,804 A | 7/2000 | Schlachter |
| 6,523,877 B1 | 2/2003 | Damian |
| 6,679,461 B1 | 1/2004 | Hawkins |
| 6,712,568 B2 | 3/2004 | Snyder et al. |
| 6,799,927 B2 | 10/2004 | Wheatley |
| 6,827,531 B2 | 12/2004 | Womack et al. |
| 6,846,140 B2 | 1/2005 | Anderson et al. |
| 7,070,374 B2 | 7/2006 | Womack et al. |
| 7,281,889 B2 | 10/2007 | Anderson et al. |
| 7,309,093 B2 | 12/2007 | Ward |
| 7,350,853 B2 | 4/2008 | Fitze |
| 7,390,154 B2 | 6/2008 | Womack et al. |
| 7,497,651 B2 | 3/2009 | Harberts et al. |
| 7,555,816 B2 | 7/2009 | Walker |
| 7,594,787 B2 | 9/2009 | Womack et al. |
| 7,819,295 B2 | 10/2010 | Plavetich |
| 7,874,774 B2 | 1/2011 | Peterson |

(Continued)

*Primary Examiner* — D Glenn Dayoan
*Assistant Examiner* — Sunsurraye Westbrook
(74) *Attorney, Agent, or Firm* — Marshall & Melhorn, LLC

(57) ABSTRACT

A rail mounting system may have a rail and a slide member. The rail has a base, two sidewalls, lip portions and ribs. Channels are formed by portions of the rail. The slide member has tabs with grooves that define legs. The lip portions and the ribs are slidably located within the groves and the legs are slidably located within the channels for selective movement of the slide member with respect to the rail.

20 Claims, 3 Drawing Sheets

(56) References Cited

U.S. PATENT DOCUMENTS

| | | | |
|---|---|---|---|
| 7,878,743 B2 * | 2/2011 | Aftanas | B60P 7/15 410/102 |
| 7,988,393 B2 * | 8/2011 | Poupon | B60N 2/07 410/102 |
| 8,057,143 B2 * | 11/2011 | Adams | B60P 7/0815 296/184.1 |
| 8,277,158 B2 | 10/2012 | Csik et al. | |
| 8,408,853 B2 | 4/2013 | Womack et al. | |
| 8,550,757 B2 | 10/2013 | Anderson et al. | |
| 8,974,160 B2 | 3/2015 | Bender | |
| 2004/0144737 A1 | 7/2004 | Lindenbeck et al. | |
| 2005/0069395 A1 * | 3/2005 | Richey | B60P 7/0823 410/102 |
| 2006/0061116 A1 | 3/2006 | Haaberg | |
| 2006/0102669 A1 | 5/2006 | Fouts et al. | |
| 2006/0244279 A1 | 11/2006 | Ranka et al. | |
| 2006/0263163 A1 | 11/2006 | Harberts et al. | |
| 2007/0036628 A1 | 2/2007 | Womack et al. | |
| 2007/0110539 A1 | 5/2007 | Klinkman et al. | |
| 2008/0185862 A1 | 8/2008 | Tarrant et al. | |
| 2013/0216326 A1 | 8/2013 | Womack et al. | |

* cited by examiner

RAIL MOUNTING SYSTEM

TECHNICAL FIELD

The present disclosure relates generally to a rail mounting system for creating an adjustable mounting surface for installing various cargo management products and systems.

BACKGROUND

Various types of rail mounting systems are known in the art. More specifically, rail mounting systems which are utilized within the context of commercial vehicles are known which allow for the transport of cargo items.

At least one type of conventional rail mounting system utilizes bolted attachments. Such a conventional rail mounting system does not provide flexibility for installing a variety of cargo management products (e.g., shelving, bins, drawer units, etc.) at least because the bolts fixe the system in a single location for use with a single product. Further, through the foregoing conventional configuration, a point load (typically at the bolt) is created that does not provide ways to distribute a load evenly over a mounting surface. An uneven distribution increases the possibility that the rail mounting system may become detached during an accident, or just through regular use.

Accordingly, there is a need and desire for a rail mounting system that can provide flexibility for installing multiple cargo products and/or allow for distributing an applied load evenly over a mounting surface. This may enhance the securement of the rail mounting system, increase the longevity of the system, the ability to use the vehicle and system for different loads and increase vehicular passenger safety during an accident.

SUMMARY

The present disclosure describes an improved rail mounting system that provides an adjustable mounting surface for installing cargo management products and systems, and the like into the cargo areas of vehicles, ships, airplanes, etc.

The present disclosure relates to a rail mounting system. The rail mounting system may include a mounting rail which includes a channel profile of a predetermined shape. Further, the rail mounting system may include a slide member. The slide member, which may be in part or in whole complementary to the channel profile, may be received within the channel and may be slidably movable within the channel.

A potential advantage of the rail mounting system allows for the distribution of an applied load evenly over a mounting surface. Another potential advantage is that one or more slide profiles of a slide member may be used with a mounting rail to allow for the installation and use of various cargo items and cargo retention products. A further potential advantage is that a user may select a position of a slide member within the mounting rail to accommodate one or more cargo retention products and cargo items in varying configurations. A further potential advantage of the present disclosure may include the cost savings in that fewer devices may be used to secure cargo; with fewer devices to work with, installation and use time is reduced.

Other features and advantages of the present disclosure may be appreciated based upon the following description when considered in conjunction with the accompanying drawings.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION

Figure 1:
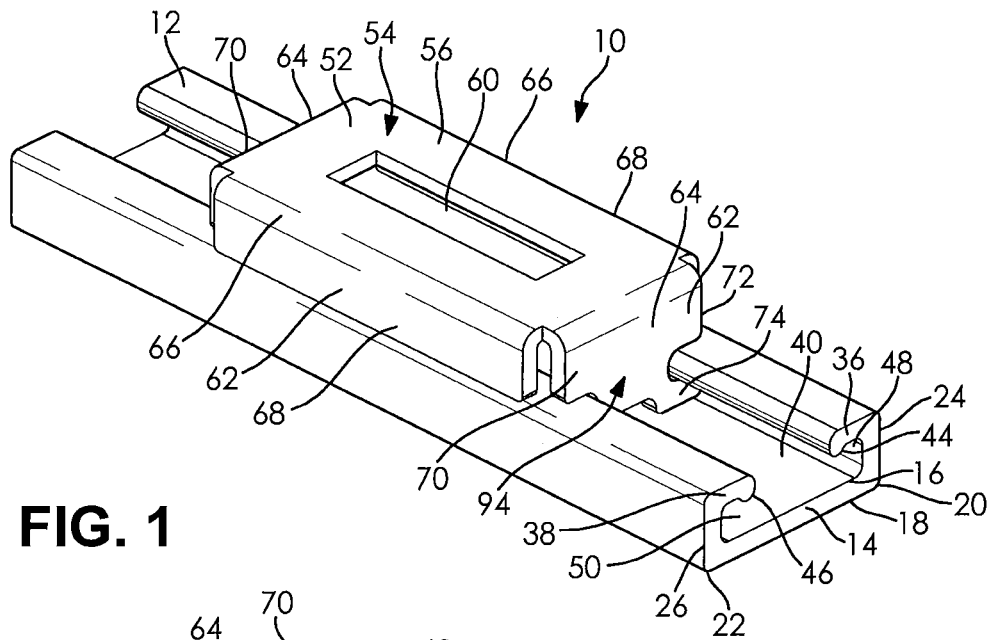
FIG. 1 is a partial perspective view of one embodiment of a rail mounting system.
Figure 2:
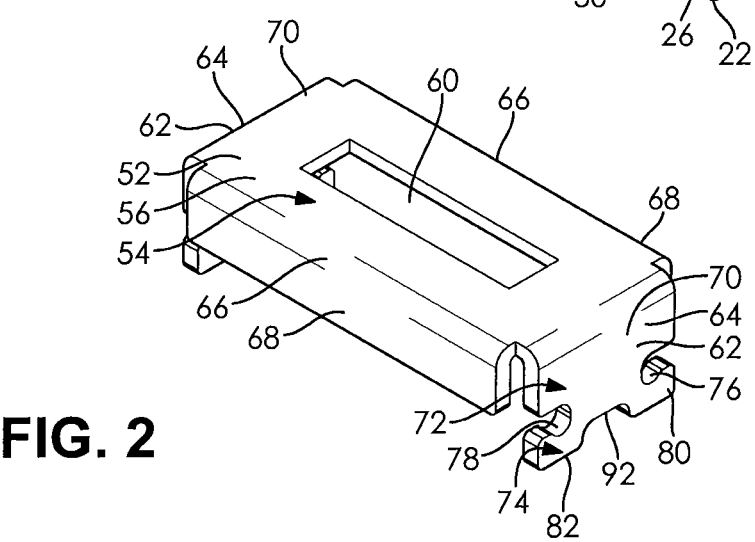
FIG. 2 is a perspective view of a slide member of the rail mounting system of FIG. 1.
Figure 3:
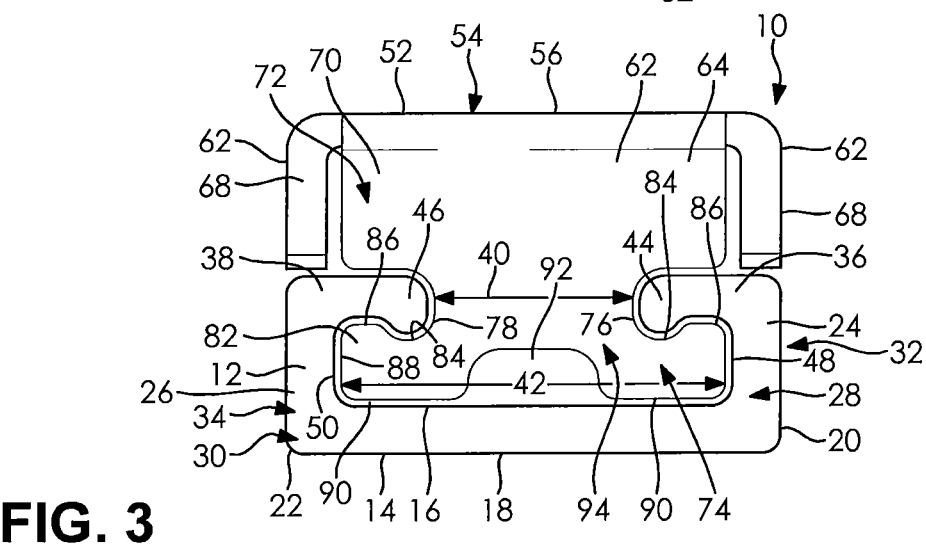
FIG. 3 is an end view of FIG. 1.
Figure 4:
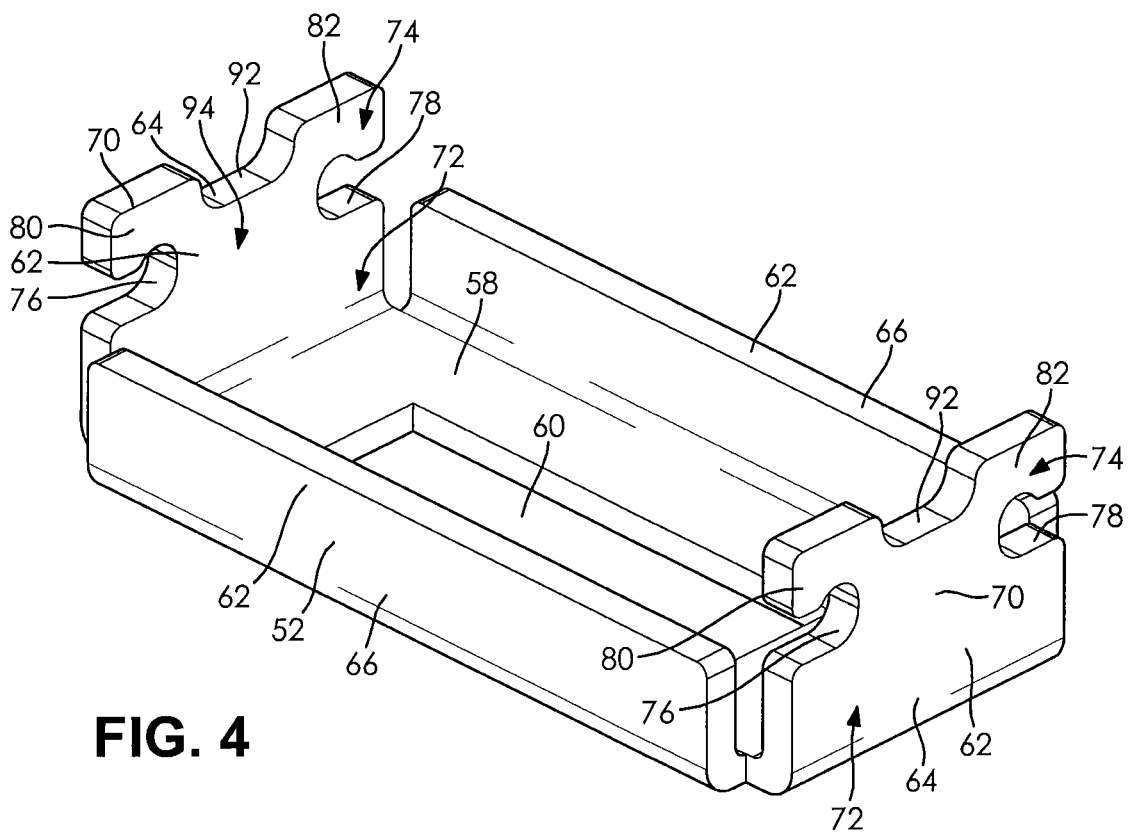
FIG. 4 is a perspective view of a bottom side of the slide member of FIG. 2.

It is to be understood that the device may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting, unless expressly stated otherwise.

Referring to the following description and drawings, exemplary approaches to the disclosed systems are detailed. Although the drawings represent some possible approaches, the drawings are not necessarily to scale and certain features may be exaggerated, removed, or partially sectioned to better illustrate and explain the disclosed devices. Further, the description below is not intended to be exhaustive, nor is it to limit the claims to the precise forms and configurations described and/or shown in the drawings.

Referring to the figures, an exemplary rail mounting system 10 is illustrated. The rail mounting system 10 includes a rail 12. The rail 12 includes a generally planar base 14 having an upper surface 16, a lower surface 18, a first side edge portion 20 and a second side edge portion 22. The base 14 has a constant width and thickness. The base 14 is unitary, one-piece and integrally formed.

The two side edge portions 20, 22 extend longitudinally along the base 14 and laterally bound the base 14. More particularly, the two side edge portions 20, 22 extend continuously along the base 14 and laterally bound the upper surface 16 and the lower surface 18.

First and second sidewalls 24, 26 are unitary, one piece and integrally formed with the base 14. The sidewalls 24, 26 each have the same height and constant thickness. The sidewalls 24, 26 each have a bottom portion 28, 30 and a top portion 32, 34. As shown in the figures, first side wall bottom portion 28 is formed with the first side edge portion 20 of the base 14 and the second side wall bottom portion 30 is formed with the second side edge portion 22 of the base 14. The sidewalls 24, 26 extend perpendicular to the base 14.

The top portion 32, 34 of each side wall 24, 26 is unitary, one-piece and integrally formed with a lip portion of the rail 12. More particularly, a first lip portion 36 extends radially inward in a perpendicular fashion from the first side wall 24. The first lip portion 36 is parallel but vertically offset from the base 14. The first lip portion 36 vertically overlaps only a portion of the base 14. The first lip portion 36 has a constant width.

A second lip portion 38 extends radially inward in a perpendicular fashion from the second side wall 26. The second lip portion 38 is planar but vertically offset from the base 14. The second lip portion 38 vertically overlaps only a portion of the base 14. The second lip portion 38 has a constant width.

The first and second lip portions 36, 38 define a first gap 40 between them. The first gap 40 has a constant width.

The first and second lip portions 36, 38, the first and second sidewalls 24, 26 and the base portion 14 define a second gap between them. The second gap 42 has a constant width. The second gap 42 has a larger width than the first gap 40.

The first and second lip portions 36, 38 have downwardly extending radiused terminal first and second ribs 44, 46, respectively. The ribs 44, 46 extend into the second gap 42 to the same vertical extent. The ribs 44, 46 are unitary, one-piece and integrally formed with the lip portions 36, 38. The ribs 44, 46 have a constant radius and the same radius as one another. The ribs 44, 46 are parallel and co-planar with one another.

The first rib 44, first lip portion 36, first side wall 24 and a portion of the base 14 form a first channel 48. The second rib 46, second lip portion 38, second side wall 26 and a portion of the base 14 form a second channel 50. The first and second channels 48, 50 are mirror images of one another and they extend the length of the rail 12.

The lower surface 18 of the base 14 may be secured to another member (not shown), such as a cargo area of a vehicle. The rail 12 may include a fastening hole (not shown) through which a fastener (not shown) is received to fixedly secure the mounting rail 12 to a cargo area surface. The fastener may include a screw, bolt, or any other suitable component which may provide a securement function.

The rail 12 may include one or more fastening holes (not shown) to fixedly secure the mounting railing 12. The fastening holes may be positioned at predetermined locations within the base 14, such as to correspond with a given vehicle make/model in order to distribute the load, or to correspond with the predetermined length of the mounting rail 12 to distribute the load. In another example, the fastening holes may be included at predetermined locations which correspond with existing mounting fastener locations.

A slide member 52 comprises part of the system 10. The slide member 52 is preferably unitary, one-piece and integrally formed.

The slide member 52 has an upper portion 54. The upper portion 54 has an upper surface 56 and a lower surface 58. The upper and lower surfaces 56, 58 define between them a constant thickness except that a through aperture 60 extends from the upper to the lower surface 56, 58.

The upper and lower surfaces 56, 58 are bounded by side portions 62. In the depicted embodiment, the slide member 52 is rectangular, which provides two shorter side portions 64 and two longer side portions 66. The shorter side portions 64 are parallel one another and the longer side portions 66 are parallel one another. The shorter side portions 64 are perpendicular to the longer side portions 66.

The longer side portions 66 are each provided with a support tab 68. The support tabs 68 extend perpendicularly downward from the upper portion 54. The support tabs 68 have a constant thickness, width and length. The support tabs 68 are substantially rectangular in shape. The support tabs 68 are mirror images of one another.

The shorter sides 64 are each provided with an engagement tab 70. The engagement tabs 70 extend perpendicularly downward from the upper portion 54. The engagement tabs 70 have a constant thickness and they are mirror images of one another.

Each engagement tab 70 has an upper portion 72 and a lower portion 74. The upper portion 72 is separated from the lower portion 74 by a first and a second groove 76, 78. The first and second grooves 76, 78 extend radially inward into the engagement tabs 70. The first and second grooves 76, 78 are parallel and co-planar with one another. The first and second grooves 76, 78 have a key-hole like shape.

The first and second grooves 76, 78 define the lower portion 74 into first and second legs 80, 82. The legs 80, 82 are mirror images of one another. Each leg 80, 82 is defined by an upper radially inwardly extending portion 84. Located laterally outward from the upper radially inwardly extending portion 84 is an upper radially outwardly extending portion 86. The upper radially outwardly extending portion 86 is laterally bounded by a vertical sidewall 88. The vertical sidewall 88 extends downwardly to a lower laterally inwardly extending base surface 90.

The two lower laterally inwardly extending base surfaces 90 of the legs 80, 82 are separated from one another by a central channel 92. The central channel 92 is an arch-shaped channel centered between the two legs 80, 82 in the lower portion 74 of the engagement tab 70.

The slide member 52 cooperates with the rail 12. A lower portion 94 of the slide member 52 is located in the first and second gaps 40, 42 of the rail 12. More particularly, the first and second lip portions 36, 38 and the first and second ribs 44, 46 are located within the first and second grooves 76, 78, respectively. Thus, the first and second grooves 76, 78 of each engagement tab 70 are axially aligned with one another.

As shown in the figures, the upper radially inwardly extending portions 84 are adjacent the first and second ribs 44, 46. And, the upper radially outwardly extending portions 86 are located adjacent the first and second lip portions 36, 38. The vertical sidewalls 88 are located adjacent the base first and second side walls 24, 26. The lower laterally inwardly extending base surfaces 90 are located adjacent the upper surface 16 of the base 14. Thus, based on the foregoing it can be appreciated that the first and second legs 80, 82 are located within the first and second channels 48, 50, respectively.

The slide member support tabs 68 are located adjacent the rail lip portions 36, 38. More particularly, bottom surfaces of the support tabs 68 are located adjacent top surfaces of the rail lip portions 36, 38. The support tabs 68 are designed to longitudinally slide with respect to the rail lip portions 36, 38.

The above-described slide member portions have a complementary shape to the above-described rail portions. Further, the slide member portions have similar, but not exactly the same dimensions, as the rail portions. Preferably, the slide member 52 has slightly smaller dimensions than the rail 12 to permit the slide member 52 to move with respect to the rail 12.

As can be appreciated from the above-descriptions, the slide member support tabs 68 and the slide member engagement tabs 70 laterally and radially secure the slide member 52 to the rail 12. The same slide member features, however, permit the slide member 52 to move in two opposite longitudinal directions within and along the rail 12. This permits the slide member 52 to be located in a preferred location along the rail 12 so that cargo can be secured, as described below. While only a single slide member 52 is depicted in the figures located in a rail 12, it can be appreciated that additional slide members 52 can be located in the same rail 12. In addition, multiple rails 12 can be located within a location to secure cargo as needed.

The rail mounting system 10 may be formed using any suitably rigid material such as aluminum, steel, plastics or any other material.

Figure 5:
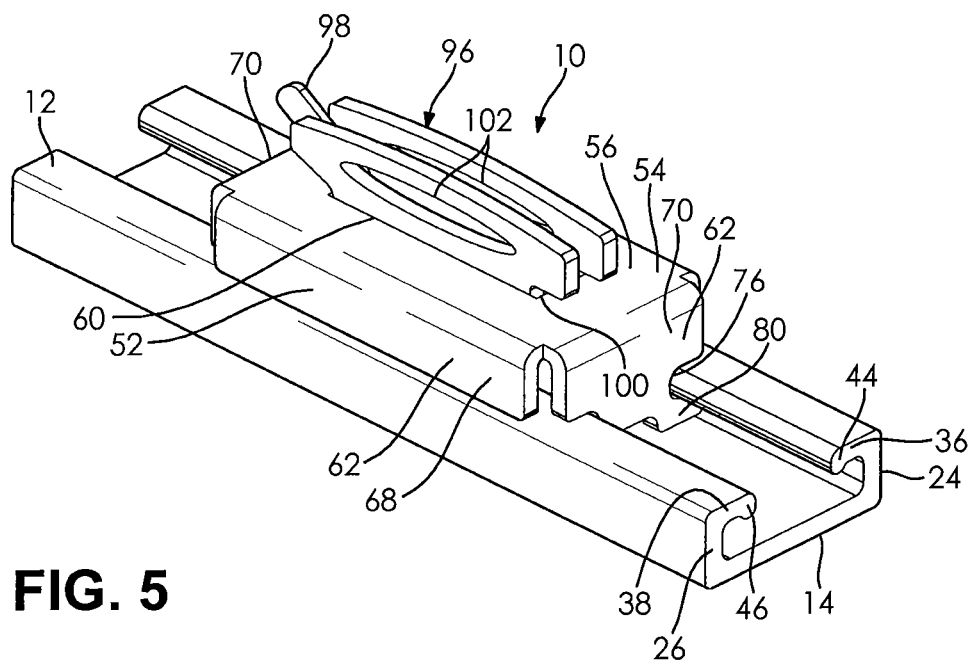
FIG. 5 is a partial perspective view of the rail mounting system of FIG. 1 with a connector installed.

The through aperture 60 in the slide member 52 may be used to accommodate a selectively removable cargo mounting device 96, as shown in FIG. 5. The device 96 may be such as an E-track fitting. Such fittings comprise a moveable, selectively lockable lever 98 that engages with the slide member 52 to lock the fitting in place. The fittings also comprise a grooved end 100 that engages with the upper surface 56 and lower surface 58 of the slide member 52. The combination of the grooved end 100 and the lockable lever 98 selectively secure the device 96 to the slide member 52. Upon disengagement of the lockable lever 98, the device 96 can be pivoted by its grooved end 100 out of the aperture 60 and removed.

The device 96 may be provided with one or more holes 102. The holes 102 can accommodate straps, rings, chains, ropes and a wide variety of other devices. These can be used to secure cargo in a vehicle or in any other location the system 10 is located.

Figure 6:
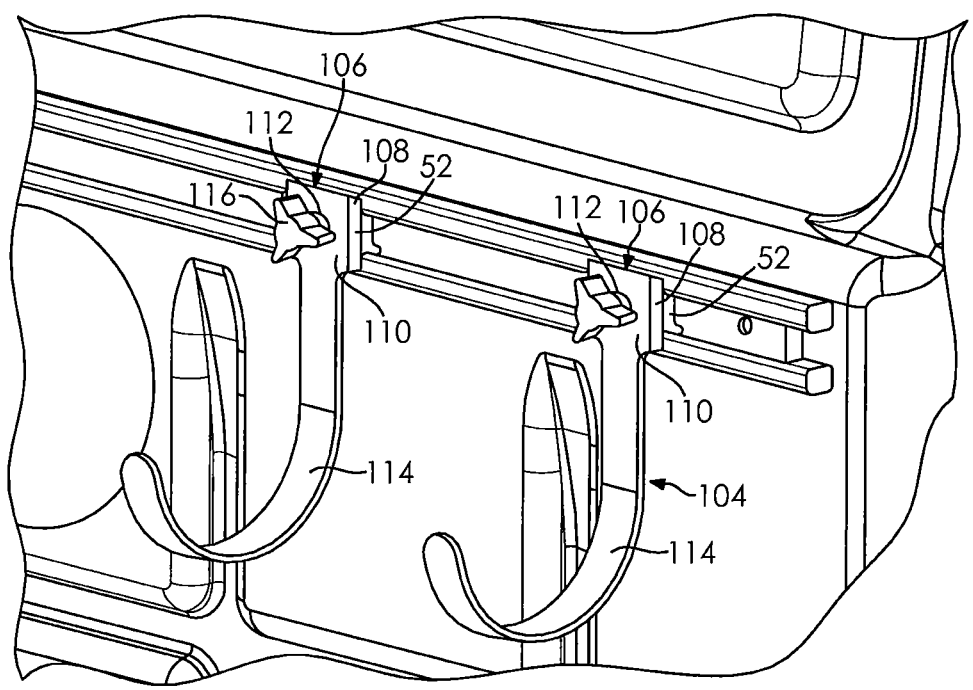
FIG. 6 is a partial perspective view of one embodiment of a selectively removable cargo mounting device.

Another embodiment of a selectively removable cargo mounting device is shown in FIG. 6. In this embodiment, a hook 104 may be selectively attached to the slide member 52. More particularly, the hook 104 may have a base 106 that selectively attaches to the slide member 52.

The base 106 may be defined by two parallel flanges 108 and a top portion 110. The flanges 108 depend downwardly from the top portion 110 so that the flanges 108 extend transverse the top portion 110. The flanges 108 may be substantially equal in their length, width and depth. The base 106 may be unitary, integrally formed and one piece.

The base 106 may have an aperture 112 extending therethrough. The aperture 112 may be substantially centered in the base 112 or it may be located in another area of the base 112. In one embodiment, the aperture 112 is threaded.

A hook portion 114 extends from the base 106. As shown in FIG. 6, the hook portion 114 may extend from one area, or side, of the base 106, such as between the two flanges 108. The hook portion 114 may be unitary, integrally formed and one piece with the base 106, or the hook portion 114 may be comprised of one or more pieces. In either case, the hook portion 114, defines a curvilinear section at least a portion of which is parallel itself to define a hook shape.

The slide member 52 may selectively attach to the base 106. One way in which the slide member 52 may attach to the base 106 is that the flanges 108 slide outwardly over the upper portions 72 of each engagement tab 70 of the slide member 52. The upper portions 72 of the engagement tab 70 are exposed when the slide member 52 is located within the rail 12.

A threaded fastener 116 may be threaded into the aperture 112 such that it extends into the through aperture 60 of the slide member 52. The threaded fastener thus vertically and laterally secured. It may also be that the slide member 52 has a complementary threaded aperture (not shown), rather than the through aperture 60, to help secure the device to the slide member 52.

The hook 104 may be used to retain or store almost any item that can be suspended or hung. This might include, but is not limited to, items such as rope, cords, or other flexible lengths of materials.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A rail mounting system, comprising:
   a rail, comprising:
      a base connected to two base sidewalls, the base sidewalls defining a first gap between them,
      lip portions extending radially inward from top portions of the base sidewalls, wherein the lip portions define a second gap between them,
      ribs downwardly extending from the lip portions,
      channels formed by the ribs, the lip portions, base side walls and base,
   a slide member, comprising:
      an upper portion and two parallel support tabs extending transverse from the upper portion and two parallel engagement tabs extending transverse from the upper portion, wherein the engagement tabs have grooves that define legs in the engagement tabs, wherein said engagement tabs alternate with said support tabs about said upper portion, wherein said support tabs have end surfaces that terminate over said lip portions, said support tab end surfaces being coplanar with upper portions of said grooves,
   wherein the lip portions and the ribs are slidably located within the grooves and the legs are slidably located within the channels.

2. The rail mounting system of claim 1, wherein the base is unitary, one-piece and integrally formed.

3. The rail mounting system of claim 2, wherein the base sidewalls are parallel one another, have the same height and extend perpendicular the base.

4. The rail mounting system of claim 1, wherein the lip portions are perpendicular the base sidewalls and parallel the base in a partially overlapping fashion.

5. The rail mounting system of claim 1, wherein the slide member is unitary, one-piece and integrally formed.

6. The rail mounting system of claim 1, wherein an upper portion of the slide member has an aperture extending therethrough.

7. The rail mounting system of claim 1, wherein the support tabs and the engagement tabs are transverse one another.

8. The rail mounting system of claim 1, wherein each leg is defined by an upper radially inwardly extending portion and an upper radially outwardly extending portion.

9. The rail mounting system of claim 8, wherein each upper radially outwardly extending portion is laterally bounded by a vertical sidewall, the vertical sidewall extending downward to a lower laterally inwardly extending base surface.

10. The rail mounting system of claim 9, wherein each lower laterally inwardly extending base is separated from one another by an arch-shaped central channel located between the two legs.

11. The rail mounting system of claim 1, wherein the support tabs are located in slidable engagement with the lip portions.

12. The rail mounting system of claim 1, wherein the support tabs and the engagement tabs laterally and radially secure the slide member to the rail but permit the slide member to move in opposite longitudinal directions within and along the rail.

13. A rail mounting system, comprising:
   a slide member, comprising:
      an upper portion, two support tabs extending transverse from the upper portion, said support tabs being parallel one another but on opposite sides of the upper portion, two engagement tabs extending in the same transverse direction from the upper portion as the support tabs, said engagement tabs parallel one another but on opposite sides of the upper portion, said engagement tabs transverse the support tabs, wherein each engagement tab has first and second grooves that define first and second legs, wherein said first and second grooves in each tab are axially aligned with one another, wherein said engagement tabs alternate with said support tabs about said upper portion, said support tabs having end surfaces that are coplanar with upper portions of said grooves.

14. The rail mounting system of claim 13, wherein the slide member is unitary, one-piece and integrally formed.

15. The rail mounting system of claim 13, wherein an upper portion of the slide member has an aperture extending therethrough.

16. The rail mounting system of claim 13, wherein the support tabs and the engagement tabs are transverse one another.

17. The rail mounting system of claim 13, wherein each leg is defined by an upper radially inwardly extending portion and an upper radially outwardly extending portion.

18. The rail mounting system of claim 17, wherein each upper radially outwardly extending portion is laterally bounded by a vertical sidewall, the vertical sidewall extending downward to a lower laterally inwardly extending base surface.

19. The rail mounting system of claim 18, wherein each lower laterally inwardly extending base is separated from one another by an arch-shaped central channel located between the two legs.

20. The rail mounting system of claim 13, wherein the support tabs are located in slidable engagement with the lip portions.

\* \* \* \* \*